(12) United States Patent
Schultz (10) Patent No.: US 7,391,388 B2
(45) Date of Patent: Jun. 24, 2008

(54) SEGMENTED SPECTRUM IMAGING SYSTEM AND METHOD

(75) Inventor: Stephen M. Schultz, Spanish Fork, UT (US)

(73) Assignee: Raytheon Company, Waltham, MA (US)

(*) Notice: Subject to any disclaimer, the term of this patent is extended or adjusted under 35 U.S.C. 154(b) by 965 days.

(21) Appl. No.: 10/282,501

(22) Filed: Oct. 28, 2002

(65) Prior Publication Data

US 2004/0080829 A1 Apr. 29, 2004

(51) Int. Cl.
*G02F 1/13* (2006.01)

(52) U.S. Cl. ............................ 345/32; 359/558; 356/305

(58) Field of Classification Search ................ 359/558, 359/563, 568, 566; 356/326, 305, 456, 451, 356/328; 250/339.06; 349/110, 57, 62; 345/204, 345/32, 33; 348/59; 347/258; 375/130; 385/37

See application file for complete search history.

(56) References Cited

U.S. PATENT DOCUMENTS

| | | | |
|---|---|---|---|
| 5,627,639 A | | 5/1997 | Mende |
| 5,710,667 A | * | 1/1998 | Goto ............................ 359/569 |
| 5,867,264 A | * | 2/1999 | Hinnrichs .................... 356/310 |
| 6,122,051 A | | 9/2000 | Cook |
| 6,128,077 A | * | 10/2000 | Jovin et al. .................. 356/310 |
| 6,325,516 B1 | * | 12/2001 | Watanabe et al. ............ 359/601 |
| 6,560,018 B1 | * | 5/2003 | Swanson ...................... 359/569 |
| 6,614,526 B1 | * | 9/2003 | Engelhardt .................. 356/326 |
| 2002/0101587 A1 | | 8/2002 | Wilson et al. | |

FOREIGN PATENT DOCUMENTS

JP 09-042925 * 1/1997

OTHER PUBLICATIONS

Takayuki et al. "Simultaneous acquisition of spectral image information", Optics Letters, vol. 16, No. 16, pp. 1277-1279, Aug. 15, 1991.

* cited by examiner

*Primary Examiner*—Abbas I Abdulselam
(74) *Attorney, Agent, or Firm*—John J. Horn (57) ABSTRACT

A system and method for producing spectrally segmented images of object fields. In one embodiment the system includes an optical system that focuses light received from an object field along a focal plane with a field stop positioned within the optical system that has plural apertures for selectively transmitting the light from the object field. A diffractive element is positioned within the optical system to spectrally spread, along the focal plane, the light transmitted through the apertures. The apertures can be parallel slots or geometrically arranges holes. The plural apertures are spaced such that the spectrally spread light transmitted through any given aperture and incident upon the focal plane does not overlap on the focal plane with the light transmitted through any other aperture. The diffractive element may spread light across one or more directions. In one embodiment, a processor is coupled to a plurality of pixels in a focal plane array. A memory for storing image data organized as a hyper-spectral cube.

67 Claims, 5 Drawing Sheets

SEGMENTED SPECTRUM IMAGING SYSTEM AND METHOD

BACKGROUND OF THE INVENTION

1. Field of the Invention

The present invention relates to imaging systems. More specifically, the present invention relates to spectrally segmented hyper-spectral image processing systems and methods.

2. Description of the Related Art

Conventional hyper-spectral images are constructed by scanning an image field in either time or space to generate information with both spectral and spatial content. The information is then processed and reconstructed into a hyper-spectral cube consisting of spatial and spectral information. A hyper-spectral cube consists of data aligned along three dimensions. Two of the dimensions are the 'X' and 'Y' coordinates of the image field, and the third dimension is wavelength. In many applications, the wavelengths involved are in the infrared and visible bands.

One application of hyper-spectral image utilization is target discrimination. Target discrimination is useful in military applications. By analyzing data between the various wavelengths, targets can be realized that would not otherwise be discernable from single, or blended, spectrum data. That is, a target can be pulled out of the clutter of the various image spectra.

Hyper-spectral imaging is also useful in medical imaging, agricultural mapping, and other image processing applications.

Hyper-spectral image processing typically involves, as a first step, construction of a hyper-spectral cube of image data. This can be accomplished in a number of ways. A typical image field reflects or emits energy over a continuous band of wavelengths. The continuous band of wavelengths is discriminated into plural narrow bands and mapped into the hyper-spectral cube. One approach to wavelength discrimination is to make multiple exposures of the image field, each sensitive to one of the plural narrow spectral bands. Wavelength discrimination can be achieved using narrow-band filters or diffractive elements that are positioned to limit the wavelengths that reach a focal plane sensing element during each of the multiple exposures. Tunable filters are also used to discriminate the plural wavelengths. However, since each exposure takes a finite period of time to allow energy to integrate on the image focal plane, the exposure period can become prohibitively long. This is particularly true in the case of an image field including moving objects, or where the focal plane sensing element is attached to a moving platform, such as an aircraft or missile.

Another approach to generating a hyper-spectral cube of image data is to use a prism or diffraction grating to spread the continuous band of wavelengths onto a focal plane sensing element during a single exposure. This creates an image that is spectrally blurred across one or more dimensions. Given that the degree of spectral spreading is known from the selection of the diffractive element, image data processing techniques are used to mathematically reconstruct the spectral and spatial information that has been blurred together. Thus, the hyper-spectral cube can be filled with data that is processed from the spectrally blurred image exposure. The scanning and reconstruction processes can be very time consuming. In addition, errors can occur in the scanning process if there is movement in the scene during exposure. Using a higher number of diffractive orders reduces errors, however, this results in greater amounts of data that must be processed during reconstruction. While this approach does allow a single exposure to be made of the image field, the data processing amounts to an inordinately large and time consuming task. For example, in the case where a focal plane array that is 100 pixels by 100 pixels in size is used to generate a hyper-spectral cube that resolves 100 wavelengths, the dimension of the cube are $10^6$ data points. The processing involved in generating the hyper-spectral cube is essentially a matrix inversion, which requires processing the square of the data. Thus, data processing in the order of $10^{12}$ is required to generate the hyper-spectral cube. As a practical matter, the prior art hyper-spectral imaging systems must gather the raw data in the field and then process it at a later time. In higher resolution system, such as 1000 by 1000 pixel systems, the processing time can extend into hours or even days of computer processing time. Obviously, in a tactical environment, the passage of time renders the ultimately resolved information far less useful than if it were available in real time.

Thus, there is a need in the art for a system and method of producing hyper-spectral image cube data, for use in hyper-spectral processing, which does not require multiple exposures or inordinately large amounts of processing time.

SUMMARY OF THE INVENTION

The need in the art is addressed by the systems and methods for producing a spectrally segmented image of an object field of the present invention. Generally, the system includes an optical system that focuses light received from the object field along a focal plane and a field stop positioned within the optical system that selectively transmits the light from the object field using a plurality of apertures that are formed therein. The system also includes a diffractive element positioned within the optical system that spectrally spreads, along the focal plane, the light transmitted through the plurality of apertures.

In a refinement of the present invention, the system further includes a focal plane array sensor positioned coincident with the focal plane. The plurality of apertures may be parallel slots, or may be arranged in a geometrically repetitive pattern. The plurality of apertures may be square apertures. In a particular refinement, the plurality of apertures are spaced such that the spectrally spread light transmitted through any given aperture and incident upon the focal plane does not overlap on the focal plane with the light transmitted through any other aperture. In a specific embodiment of the present invention, the diffractive element is a diffraction grating. The diffractive element may diffract light in one direction, two directions, or plural directions.

In a refinement of the present invention, the optical system further includes a first lens group positioned to receive the light from the object field and form a first image thereof at the position of the field stop. Also, a second lens group is positioned to collimate the light from the first image, and, the diffractive element is positioned along the path of the collimated light. Finally, a third lens group is positioned to receive the collimated and diffracted light, and to form a second image thereof at the focal plane.

In a specific embodiment, the system further includes a processor coupled to a plurality of pixels in the focal plane array and a memory coupled to the processor for storing image data organized as a hyper-spectral cube. In operation, the processor reads spectrally spread light energy values from the plurality of pixels and stores the light energy values in the memory, which are organized as a hyper-spectral cube.

The present invention also teaches a method of producing a spectrally segmented image of an object field on a focal plane in a system that has a field stop with a plurality of apertures formed therein. The method includes the steps of selectively transmitting light by passing the light received from the object field through the plurality of apertures in the field stop and then diffracting the selectively transmitted light to spectrally spread the light. Finally, focusing the selectively transmitted and spectrally spread light along the focal plane.

In a specific embodiment, a focal plane array having plural pixel sensing elements therein is positioned coincident with the focal plane. The method includes the further step of spectrally segmenting the image according to the pixel size and spacing in relation to the diffracting step. The plurality of apertures may be parallel slots or may be arranged in a geometrically repetitive pattern. The plurality of apertures may be square apertures. In a refinement of the present invention, the plurality of apertures are spaced such that the spectrally spread light transmitted through any given aperture and incident upon the focal plane does not overlap on the focal plane with the light transmitted through any other aperture. In a specific embodiment, the diffractive element is a diffraction grating. The diffractive element may diffract light in one, two directions or plural directions. The method may include the further step of reading the light energy levels read from the plurality of pixels and organizing them as a hyper-spectral cube of data.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The present invention eliminates the need for scanning and time consuming reconstruction of two-dimensional image data previously required for hyper-spectral image analysis, including the development of hyper-spectral cube image data. The prior art includes a computed tomographic imaging spectrometer ("CTIS") that simultaneously collects both spectral and spatial information. CTIS constructs a three-dimension object from two dimension projections. Such projections are produced and controlled by the diffractive order of a grating disperser. The reconstruction algorithm, however, is time consuming and results in errors. The difficulty arises from the overlap of spectral and spatial information. It is known that using higher diffractive orders in the process will reduce these errors, however, this results in even more time consuming reconstruction algorithm processing.

The present invention addresses the deficiencies of the prior art by producing better separation between the spectral and spatial information as it is initially gathered, sensed and measured. The improvement is achieved by leaving some empty space between the individual spatial pixels along the focal plane array sensor. The empty space is created by using a field stop that has plural apertures, and that is placed at an intermediary image plane within an optical system. The empty space on the focal plane array is subsequently filled with spectral information by using a grating disperser. The separation between spatial and spectral information reduces or eliminates the need for time-consuming reconstruction algorithm processing. In an illustrative embodiment, better separation is produced between spatial and spectral information when a hyper-spectral cube is mapped onto a two-dimension focal plane array. Thus, the hyper-spectral cube data can be directly read off of focal plane array by a processing device.

Figure 1:
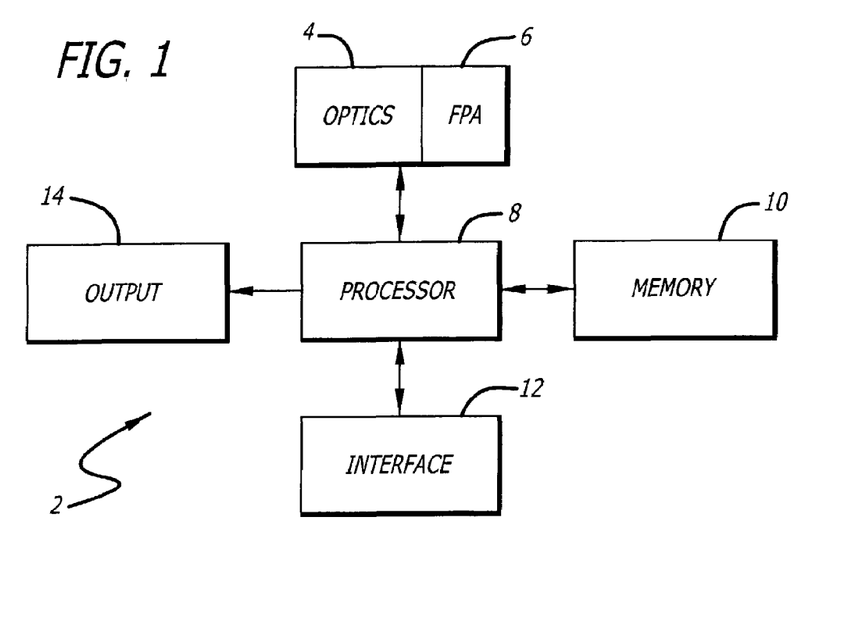
FIG. 1 is a functional block diagram of a segmented spectrum imaging system according to an illustrative embodiment of the present invention.

Reference is directed to FIG. 1, which is a functional block diagram of a hyper-spectral imaging system 2 according to an illustrative embodiment of the the teachings of the present invention. An optical system 4 performs the spectral separation and forms an image of an object field (the target) on a focal plane array sensor 6. Focal plane array sensors are known to those skilled in the art. A processor 8 is coupled to the optical system 4 and focal plane array 6, and operates to read image data from the focal plane array 6. A memory 10 is coupled to the processor 8, which provides storage space for the read image data, as well as providing software and variable storage space. An interface 12 is provided. The function of the interface is dependent upon the application of the system, but typically, the interface provides an operational user interface. Processed image information is provided to an output circuit 14, which is also dependent upon the application of the system. The output circuit might be a video display, a communications link, or another processor or control system.

Figure 2:
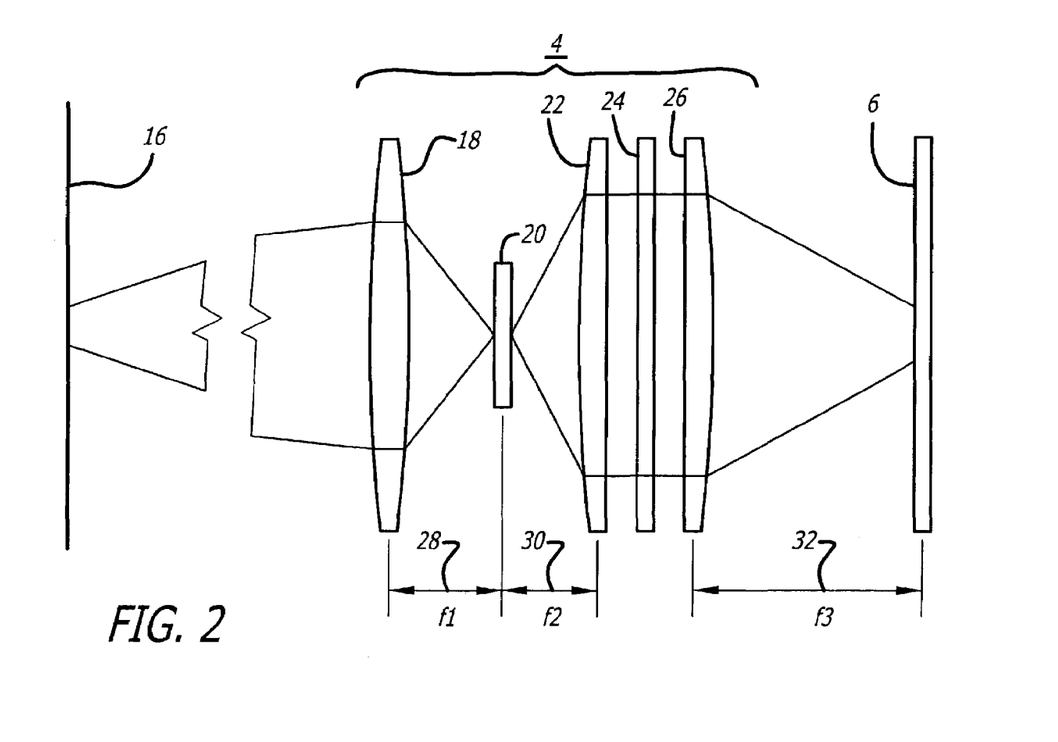
FIG. 2 is an optical system diagram of a segmented spectrum imaging system according to an illustrative embodiment of the present invention.

Reference is directed to FIG. 2, which is an optical diagram, including the optical system 4, the image field 16 and focal plane array 6 according to an illustrative embodiment of the present invention. The optical system 4 consists of three lenses or lens groups 18, 22, and 26, a field stop 20, and a diffraction grating spectral disperser 24. The optical system 4 forms an image of the object field 16 on the focal plane array sensor 6 that is spectrally spread as described herein. The first lens group 18 forms an intermediary image of the object field 16 at the location of the field stop 20. The focal length of the first lens group 20 is given by f1 28. The field stop 20 selectively transmits plural portions of the intermediary image according to the arrangement of plural apertures in the field stop 20. The second lens group 22 collimates the selectively transmitted intermediary image, which is then spectrally diffracted by the diffraction grating disperser 24 into a spectrally spread image of the selectively transmitted object field 16. The focal length of the second lens group 22 is given by f2 30. The third lens group 26 then re-focuses the spectrally spread image onto the focal plane array sensor 6. The focal length of the third lens group 26 is given by f3 32.

In prior art hyper-spectral imaging systems, the image is located in the center of the focal plane array. A grating disperser diffracts the entire image to produce various projections, which overlap with one another. The grating equation specifies the angle at which each incident ray is diffracted and is given by:

$$\sin(\theta_d) = \sin(\theta_i) + \frac{m\lambda}{\Lambda},  \quad \text{Equ. (1)}$$

where $\theta_d$ and $\theta_i$ are respectively the propagation angles of the diffracted and incident rays, m is the diffraction order, $\lambda$ is the wavelength, and $\Lambda$ is the periodicity of the grating. The grating diffracts the image into a series of discrete spatial projections of the image. The spatial locations of these image projections depend on the grating period $\Lambda$, the wavelength $\lambda$, and the grating order m consistent with Equation 1. The wavelength dependence or dispersion causes the wavelengths of the image to separate. The image consists of a continuous band of wavelength, and thus, the dispersion causes the image projections to be smeared with respect to wavelength. The amount the image is smeared depends on the grating period $\Lambda$ and the grating order m. Since the image is smeared with respect to wavelength, a significant processing operation must be undertaken to separate the spectral and spatial information, in order to generate a hyper-spectral cube of image data.

Figure 3:
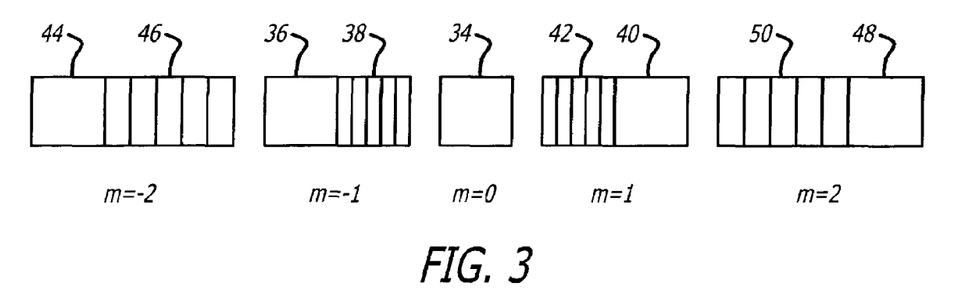
FIG. 3 is a partial image field diagram illustrating image pixels modified by various diffractive orders.

Reference is directed to FIG. 3, which is a partial image field diagram illustrating image pixels modified by various diffractive orders. In FIG. 3, a single dimension diffraction grating is employed, having five diffractive orders (m=−2, −1, 0, +1, +2). FIG. 3 illustrates the spectral smearing of an image under the different diffractive orders. The five discrete wavelengths shown are separated spatially by the diffraction grating. The wavelength separation depends on the grating order m. The first image 44 is smeared by the m=−2 grating order to produce five discrete bands of wavelengths 46. The m=−2 order has twice the separation as the m=−1 order. Note that the image 36 that is spread with the m=−1 order has half the degree of smear 38 as the m=−2 order smear 46. The m=0 order grating produces only an undiffracted image 34, resulting in no wavelength separation. Similarly, the m=1 order diffracts the image 40 to produce spectral smear 42 that has the same magnitude as the m=−1 order 38, but in the opposite direction. Likewise, the m=2 order filter diffracts the image 48 to produce spectral smear 50 that has the same magnitude as the m=−2 order 46, but in the opposite direction. Also, note that in this illustration only discrete wavelengths are shown. Those skilled in the art will appreciate that an actual scene with a continuum of spectral energy will contain a continuous band of wavelengths in the diffracted areas, thus, resulting in even greater overlap. Even in the presence of coupling between spatial and spectral information, those skilled in the art are aware that the various two dimension projections can be used to reconstruct a three dimension hyper-spectral cube (x, y, $\lambda$) using computed tomography techniques. The accuracy of the reconstruction depends on the amount of spatial and spectral coupling and the number of projections, however, as the number of projections increases the amount of required memory and processing time increase.

Figure 4:
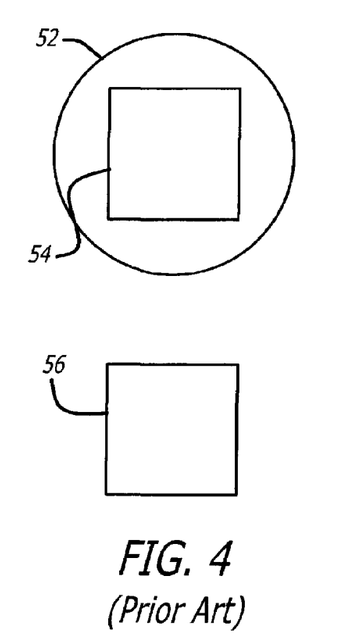
FIG. 4 is a field stop and image aperture according to the prior art.

The present invention addresses the limitations on the prior art. In an illustrative embodiment of the present invention, the conventional single square aperture field stop is replaced with a series of holes or slots depending on whether a two dimension or one dimension grating disperser is used. Reference is directed to FIG. 4, which illustrates a prior art field stop design. The prior art field stop 52 has a single square aperture 54, which produces a square image field 56 on the focal plane array. Now referring to FIG. 5, which illustrates a field stop design according to an illustrative embodiment of the present invention, note that the field stop 58 includes plural slot apertures 60. Each of the plural apertures 60 are spaced apart by a distance selected in accordance with the order of the grating disperser employed in the system. With no diffraction (m=0), note the image field 62 that is imposed upon the focal plane array. The empty space between the plural slotted image areas 62 is the space on the focal plane array onto which the diffracted image is cast. By using this approach, the degree of smearing can be selected such that no image overlap occurs. This is because the spectral smear occurs in the otherwise non-illuminated portions of the focal plane array.

Typical prior art CTIS systems place the image of the object field at the center of the focal plane array. The illustrative embodiment of the present invention, however, spreads the image over the entire focal plane array. The grating disperser then spectrally spreads the image into the empty space located between the various pixels.

Figure 5:
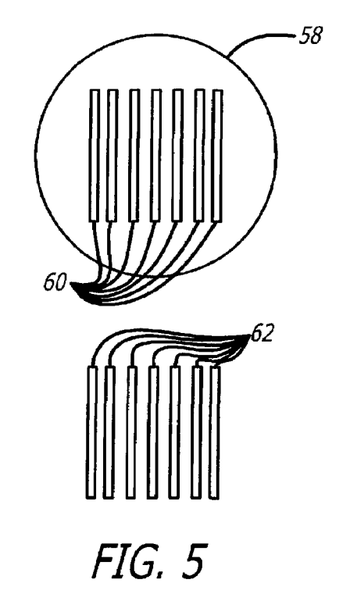
FIG. 5 is a field stop and image aperture according to an illustrative embodiment of the present invention.
Figure 6:
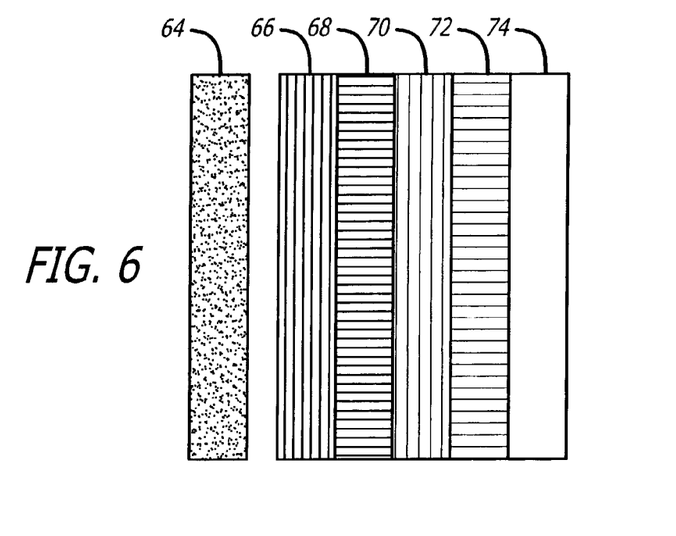
FIG. 6 is an image field spectrum diagram according to an illustrative embodiment of the present invention.

Reference is directed to FIG. 6, which is an image field spectrum diagram showing a small fraction of an image field for a one-dimension disperser, similar to that shown in FIG. 5. In FIG. 6, note that the principal image 64 is transmitted through the grating disperser while the diffracted image is spread into five spectral bands, 66, 68, 70, 72, and 74. The bandwidths are arbitrarily defined according to the relationship of the focal plane array pixel spacing and the order of the disperser, as well as the optical formulation of the systems, as is understood by those skilled in the art. In FIG. 6, five bands are defined, with each band gradually spreading the wavelengths of the diffracted light in space.

Figure 7:
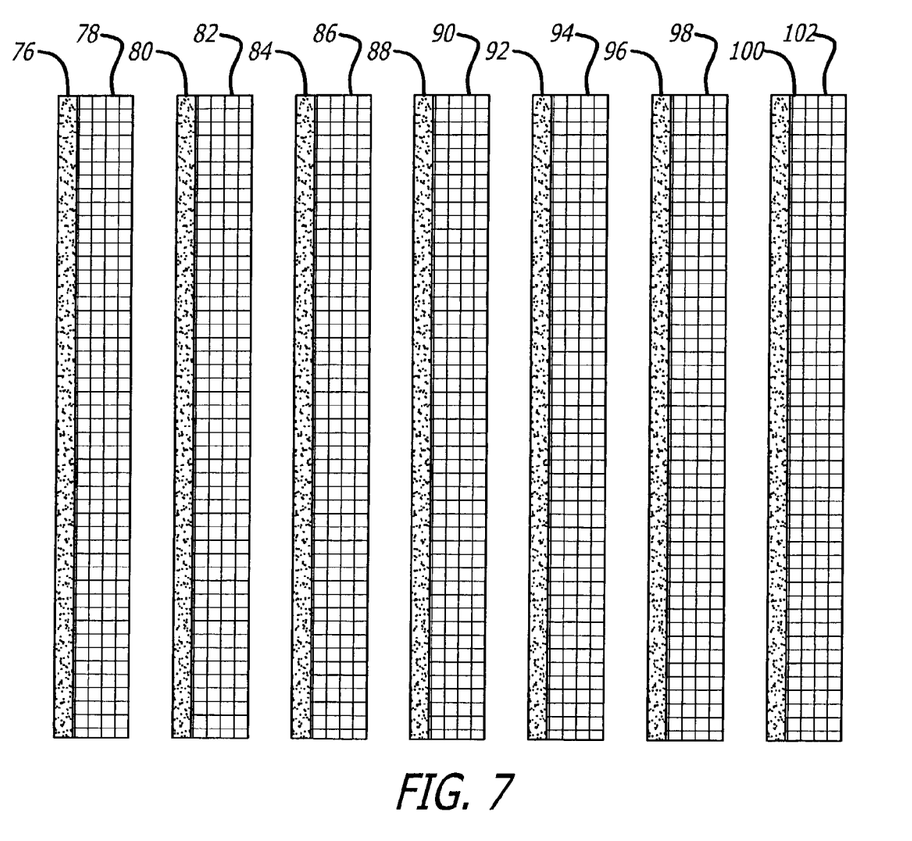
FIG. 7 is an image field spectrum diagram according to an illustrative embodiment of the present invention.

Reference is directed to FIG. 7, which is an image field spectrum diagram illustrating plural image slots that are diffracted by a one-dimension plural parallel slot field stop. FIG. 7 illustrates a seven slot field stop. Each principal image 76, 80, 84, 88, 92, 96, and 100 are spectrally spread into four wavelengths bands 78, 82, 86, 90, 94, 98, and 102, respectively. Note that the spread of any given aperture slot does not overlap with either of its adjacent images. In FIG. 7, each small square area represents one pixel on the focal plane array. Hence, the image is mapped, both spatially and spectrally onto the focal plane array, and can be read directly therefrom without the need for any image processing, other than simple data addressing. The image in FIG. 7 contains only the m=−1 diffracted order. Also, note that in this illustration only discrete wavelengths are shown. Those skilled in the art will appreciate that an actual scene with a continuum of spectral energy will contain a continuous band of wavelengths in the diffracted areas, thus, resulting in some overlap. However, the overlap or coupling between spectral and spatial information is greatly reduced from that of the prior art. The illustrative embodiment can also be configured such that the $0^{th}$ order (m=0) diffracted order lies between the spectral components. This result in an entirely spatial image interlaced with a pixel-by-pixel spectra. The illustrative embodiment of FIG. 7 contemplates a field stop consisting of parallel slots in one direction. This produces a high spatial resolution in one direction. The present invention contemplates two directions or plural directions as well.

Figure 8:
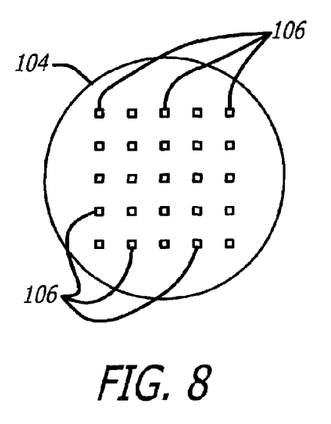
FIG. 8 is a field stop and aperture drawing according to an illustrative embodiment of the present invention.

Reference is directed to FIG. 8, which is a field stop drawing of a two-direction field stop according to an illustrative embodiment of the present invention. The field stop 104 includes a plurality of square apertures 106 geometrically arranged as plural rows and plural columns. As in the previous illustrative embodiments, there is a space provided around each of the plural apertures 106 that allows spectral spreading onto the focal plane array with a minimum of spectral and spatial overlap. A crossed-grating or a two-dimension grating is used to produce more projections of the image onto the focal plane array.

Figure 9:
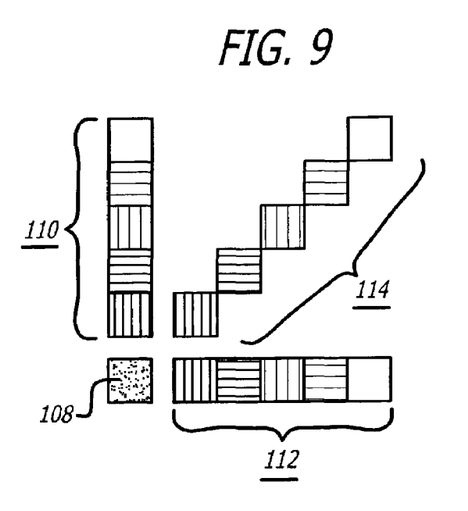
FIG. 9 is an image field spectrum diagram according to an illustrative embodiment of the present invention.

In FIG. 9, the spectral spreading for a single aperture is shown for the case where a two-direction grating disperser is employed. The $0^{th}$ order (un-diffracted) image 108 is shown. Also, the spectrally spread images 110 along a first directions and 112 along a second direction, orthogonal to one another. The image product 114 of the two directions also appears, as is understood by those skilled in the art.

Figure 10:
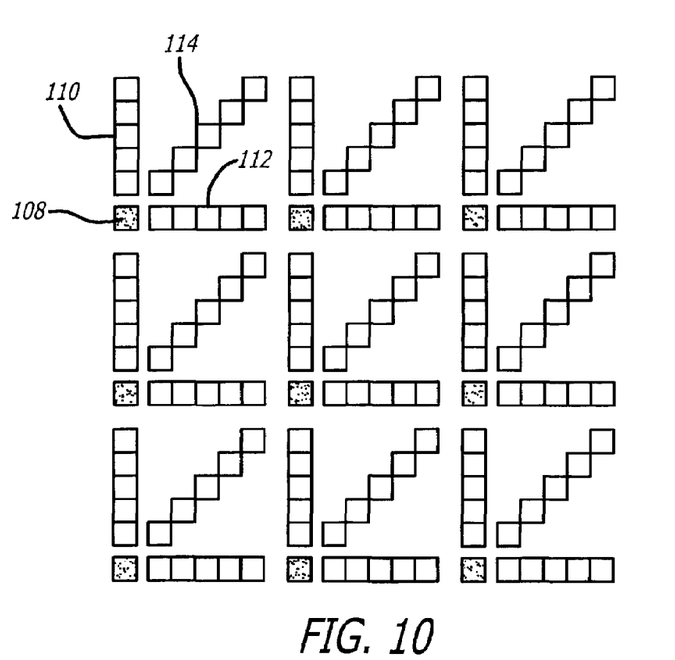
FIG. 10 is an image field spectrum diagram according to an illustrative embodiment of the present invention.

Referring now to FIG. 10, which is a image field spectrum diagram of a portion of the image field corresponding to the field stop of FIG. 8. In FIG. 10, nine aperture field images are shown. This Figure illustrates the arrangement on the focal plane array, with each square corresponding to a pixel.

Figure 11:
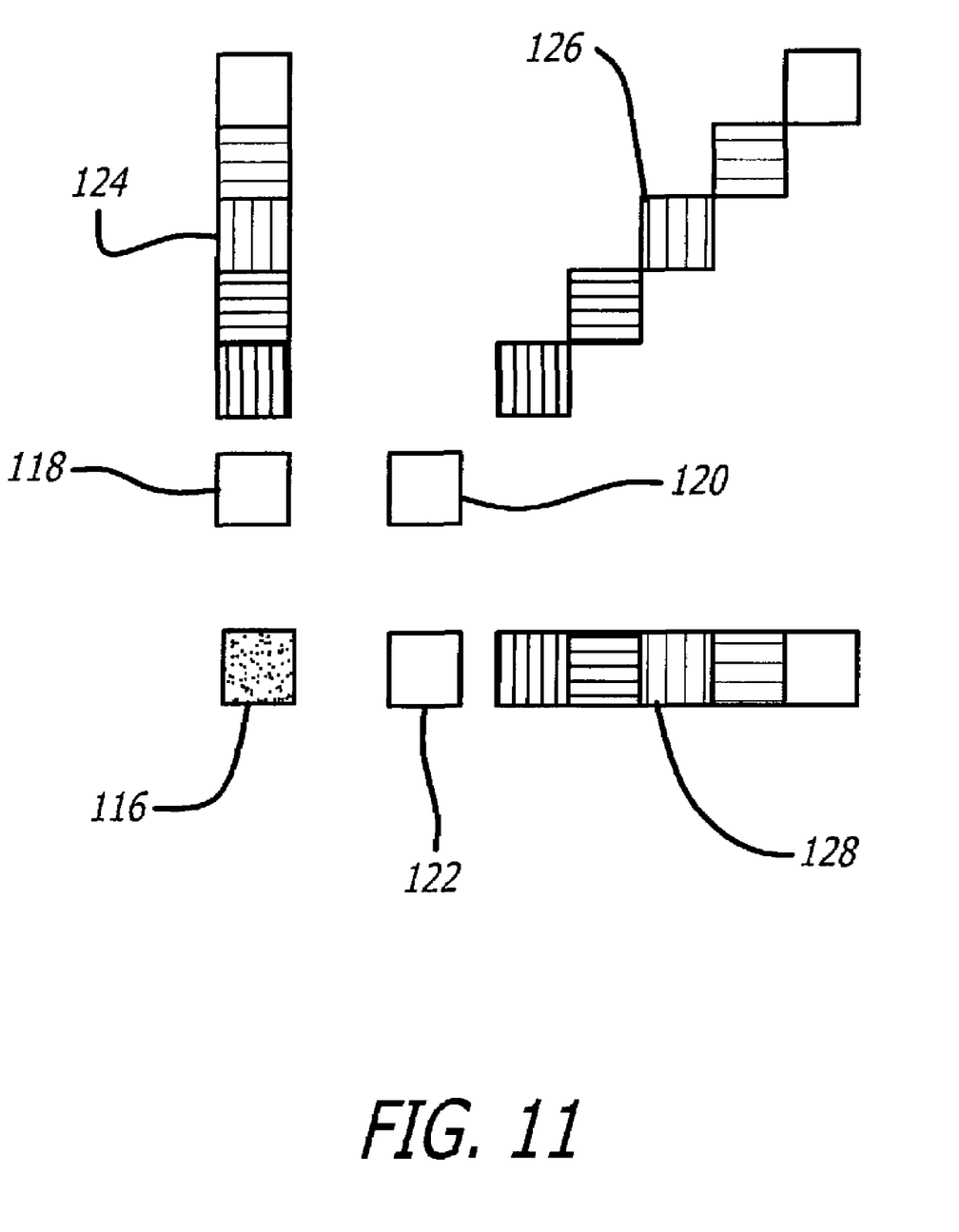
FIG. 11 is an image field spectrum diagram according to an illustrative embodiment of the present invention.

FIG. 11 illustrates the case for a $2^{nd}$ order grating disperser, for a single aperture. The principal image 116 appears together with the principal images for three adjacent field stop apertures, 118, 120, and 122. The first direction spectral spread 124 and second direction spectral spread 128 also appear, together with the product spread 126. This illustrative embodiment reduces the coupling between the spatial and spectral information. However, if greater spectral resolution is desired, the various projections illustrated in FIG. 11 can be used to reconstruct the image using a computed tomography algorithm. This reconstruction can be done on a pixel by pixel basis if desired, thus, greatly reducing the required memory and processing time.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A system for producing a spectrally segmented image of an object field, comprising:
    an optical system that focuses light received from the object field along a focal plane;
    a field stop positioned within said optical system, having a plurality of apertures formed therein for selectively transmitting the light from the object field; and
    a diffractive element positioned within said optical system to spectrally spread, along said focal plane, the light transmitted through said plurality of apertures;
    a focal plane array positioned coincident with said focal plane;
    a processor coupled to a plurality of pixels in said focal plane array;
    a memory coupled to said processor fix storing image data organized as a hyper-spectral cube, and
    wherein said processor operates to read spectrally read light energy values from said plurality of pixels and to store said light energy values in said memory, organized as a hyper-spectral cube.

2. The system of claim 1 wherein said plurality of apertures are parallel slots.

3. The system of claim 1 wherein said plurality of apertures are arranged in a geometrically repetitive pattern.

4. The system of claim 1 wherein said plurality of apertures are square.

5. The system of claim 1 wherein said plurality of apertures are spaced such that the spectrally spread light transmitted through any given aperture and incident upon said focal plane does not overlap on said focal plane with the light transmitted through any other aperture.

6. The system of claim 1 wherein said diffractive element is a diffraction grating.

7. The system of claim 1 wherein said diffractive element diffracts light in one direction.

8. The system of claim 1 wherein said diffractive element diffracts light in two directions.

9. The system of claim 1 wherein said diffractive element diffracts light in plural directions.

10. The system of claim 1 wherein said optical system further comprises:
    a first lens group positioned to receive the light from the object field and form a first image thereof at said position of said field stop;
    a second lens group positioned to collimate the light from said first image, said diffractive element positioned along the path of the collimated light, and
    a third lens group positioned to receive the collimated and diffracted light and to form a second image thereof at said focal plane.

11. A system for producing a spectrally segmented image of an object field, comprising:
    a first lens group positioned to receive the light from the object field and form a first image thereof at a first position;
    a field stop positioned at said first position, said field stop having a plurality of parallel slot apertures formed therein for selectively transmitting the light received from the object field;
    a second lens group positioned to collimate said selectively transmitted light;
    a diffraction grating positioned to spectrally spread said collimated light along a direction perpendicular to said plurality of parallel slot apertures;
    a third lens group positioned to receive said collimated and spectrally spread light and to form a second image thereof along said focal plane, wherein said plurality of parallel slot apertures are spaced apart such that the spectrally spread light transmitted through any given aperture and incident upon said focal plane does not overlap on said focal plane with the light transmitted through any other aperture;
    a focal plane array, having a plurality of light sensitive pixels therein, positioned coincident with said focal plane;
    a processor coupled to said plurality of pixels in said focal plane array; and
    a memory coupled to said processor for storing image data organized as a hyper-spectral cube, wherein said processor operates to read spectrally spread light energy values from said plurality of pixels and to store said light energy values in said memory, organized as a hyper-spectral cube.

12. A method of producing a spectrally segmented image of an object field on a focal plane in a system having a field stop with a plurality of apertures formed therein, comprising the steps of:

selectively transmitting light by passing the light received from the object field through the plurality of apertures in the field stop;

diffracting said selectively transmitted light to spectrally spread the light;

focusing said selectively transmitted and spectrally spread light along the focal plane; and reading the light energy levels read from a plurality of pixels in a focal plane array positioned coincident with the focal plane and organizing them as a hyper-spectral cube of data.

13. The method of claim 12 wherein a focal plane array, having plural pixel sensing elements therein, is positioned coincident with the focal plane, further comprising the step of spectrally segmenting the image according to the pixel size and spacing in relation to said diffracting step.

14. The method of claim 12 wherein the plurality of apertures are parallel slots.

15. The method of claim 12 wherein the plurality of apertures are arranged in a geometrically repetitive pattern.

16. The method of claim 12 wherein the plurality of apertures are square.

17. The method of claim 12 wherein the plurality of apertures are spaced such that the spectrally spread light transmitted through any given aperture and incident upon the focal plane does not overlap on the focal plane with the light transmitted through any other aperture.

18. The method of claim 12 wherein said diffracting step is accomplished with a diffraction grating.

19. The method of claim 12 wherein said diffracting step diffracts light in one direction.

20. The method of claim 12 wherein said diffracting step diffracts light in two directions.

21. The method of claim 12 wherein said diffracting step diffracts light in plural directions.

22. A system for producing a spectrally segmented image of an object field on a focal plane, comprising:

a field stop having a plurality of apertures formed therein;

means for selectively transmitting light by passing the light received from the object field through said plurality of apertures in said field stop;

means for diffracting said selectively transmitted light to spectrally spread the light;

means for focusing said selectively transmitted and spectrally spread light along the focal plane; and a means for reading the light energy levels read from the plurality of pixels and organizing them as a hyper-spectral cube of data.

23. The system of claim 22 wherein a focal plane array, having plural pixel sensing elements therein, is positioned coincident with the focal plane, further comprising a means for spectrally segmenting the image according to the pixel size and spacing in relation to said means for diffracting.

24. The system of claim 22 wherein said plurality of apertures are parallel slots.

25. The system of claim 22 wherein said plurality of apertures are arranged in a geometrically repetitive pattern.

26. The system of claim 22 wherein said plurality of apertures are square.

27. The system of claim 22 wherein said plurality of apertures are spaced such that the spectrally spread light transmitted through any given aperture and incident upon the focal plane does not overlap on the focal plane with the light transmitted through any other aperture.

28. The system of claim 22 wherein means for diffracting is a diffraction grating.

29. The system of claim 22 wherein said means for diffracting diffracts light in one direction.

30. The system of claim 22 wherein said means for diffracting diffracts light in two directions.

31. The system of claim 22 wherein said means for diffracting diffracts light in plural directions.

32. A system for producing a spectrally segmented image of an object field comprising:

optical means for focusing electromagnetic energy received from the object field along a focal plane array;

blocking means disposed between said optical means and said focal plane array for creating a pattern by which predetermined pixels are illuminated with said energy and an empty space is created between said illuminated pixels; and diffractive means disposed between said blocking means and said focal plane for spectrally spreading said energy whereby spectral information is provided in at least one of said empty spaces.

33. The invention of claim 32 wherein said empty spaces are filled with spectral information.

34. The invention of claim 32 wherein said blocking means includes a field stop.

35. The invention of claim 34 wherein said field stop is apertured.

36. The invention of claim 32 wherein said diffractive means is a grating disperser.

37. The invention of claim 32 further including a processor coupled to said focal plane array.

38. The invention of claim 37 further including a memory coupled to said processor for storing image data organized as a hyper-spectral cube.

39. The invention of claim 38 further including means for causing said processor to read spectrally spread energy values from said array and to store said energy values in said memory as a hyper-spectral cube.

40. A system for producing a spectrally segmented image of an object field, comprising:

an optical system that focuses light received from the object field along a focal plane;

a field stop positioned within said optical system, having a plurality of apertures formed therein for selectively transmitting the light from the object field;

a diffractive element positioned within said optical system to spectrally spread, along said focal plane, the light transmitted through said plurality of apertures;

a first lens group positioned to receive the light from the object field and form a first image thereof at said position of said field stop;

a second lens group positioned to collimate the light from said first image, said diffractive element positioned along the path of the collimated light, and a third lens group positioned to receive the collimated and diffracted light and to form a second image thereof at said focal plane.

41. The system of claim 40 further comprising a focal plane array positioned coincident with said focal plane.

42. The system of claim 40 wherein said plurality of apertures are parallel slots.

43. The system of claim 40 wherein said plurality of apertures are arranged in a geometrically repetitive pattern.

44. The system of claim 40 wherein said plurality of apertures are square.

45. The system of claim 40 wherein said plurality of apertures are spaced such that the spectrally spread light transmitted through any given aperture and incident upon said focal plane does not overlap on said focal plane with the light transmitted through any other aperture.

46. The system of claim 40 wherein said diffractive element is a diffraction grating.

47. The system of claim 40 wherein said diffractive element diffracts light in one direction.

48. The system of claim 40 wherein said diffractive element diffracts light in two directions.

49. The system of claim 40 wherein said diffractive element diffracts light in plural directions.

50. A method of producing a spectrally segmented image of an object field on a focal plane in a system having a field stop with a plurality of apertures formed therein, comprising the steps of:

selectively transmitting light by passing the light received from the object field through the plurality of apertures in the field stop;

diffracting said selectively transmitted light to spectrally spread the light;

focusing said selectively transmitted and spectrally spread light along the focal plane; and spectrally segmenting the image according to pixel size and spacing in relation to said diffracting step, said pixels being in a focal plane array, having plural pixel sensing elements therein positioned coincident with the focal plane.

51. The method of claim 50 wherein the plurality of apertures are parallel slots.

52. The method of claim 50 wherein the plurality of apertures are arranged in a geometrically repetitive pattern.

53. The method of claim 50 wherein the plurality of apertures are square.

54. The method of claim 50 wherein the plurality of apertures are spaced such that the spectrally spread light transmitted through any given aperture and incident upon the focal plane does not overlap on the focal plane with the light transmitted through any other aperture.

55. The method of claim 50 wherein said diffracting step is accomplished with a diffraction grating.

56. The method of claim 50 wherein said diffracting step diffracts light in one direction.

57. The method of claim 50 wherein said diffracting step diffracts light in two directions.

58. The method of claim 50 wherein said diffracting step diffracts light in plural directions.

59. A system for producing a spectrally segmented image of an object field on a focal plane, comprising:

a field stop having a plurality of apertures formed therein;

means for selectively transmitting light by passing the light received from the object field through said plurality of apertures in said field stop;

means for diffracting said selectively transmitted light to spectrally spread the light;

means for focusing said selectively transmitted and spectrally spread light along the focal plane;

a focal plane array, having plural pixel sensing elements therein, positioned coincident with the focal plane; and means for spectrally segmenting the image according to the pixel size and spacing in relation to said means for diffracting.

60. The system of claim 59 wherein said plurality of apertures are parallel slots.

61. The system of claim 59 wherein said plurality of apertures are arranged in a geometrically repetitive pattern.

62. The system of claim 59 wherein said plurality of apertures are square.

63. The system of claim 59 wherein said plurality of apertures are spaced such that the spectrally spread light transmitted through any given aperture and incident upon the focal plane does not overlap on the focal plane with the light transmitted through any other aperture.

64. The system of claim 59 wherein means for diffracting is a diffraction grating.

65. The system of claim 59 wherein said means for diffracting diffracts light in one direction.

66. The system of claim 59 wherein said means for diffracting diffracts light in two directions.

67. The system of claim 59 wherein said means for diffracting diffracts light in plural directions.

* * * * *